May 28, 1935.  L. ZAIGER  2,003,028
WINDSHIELD HEATER
Filed June 6, 1934  2 Sheets-Sheet 2

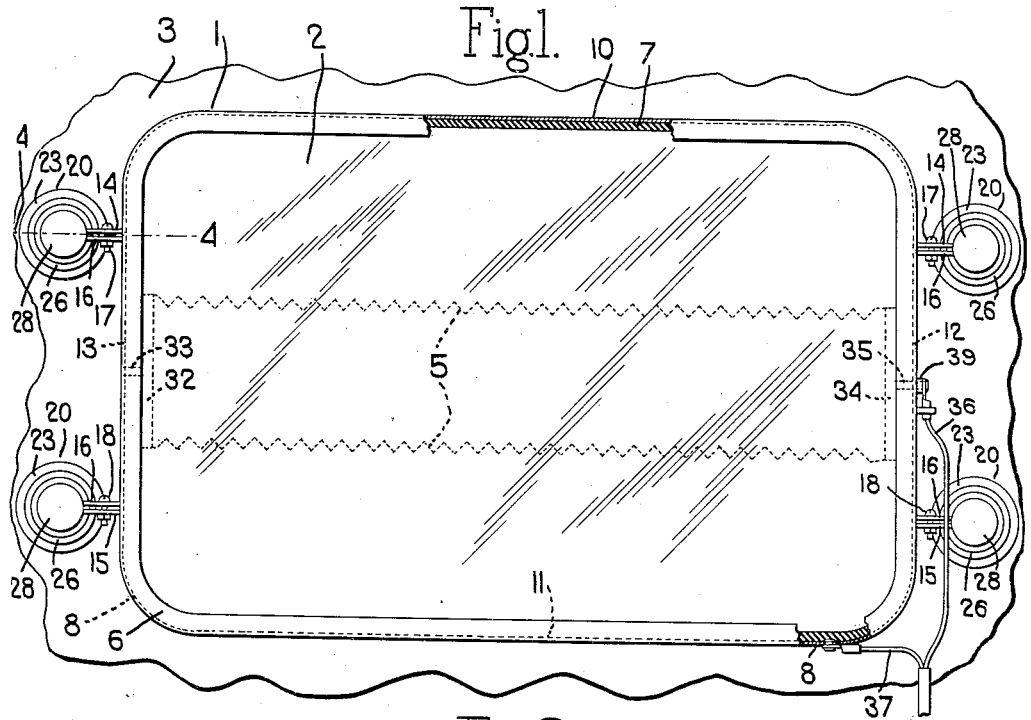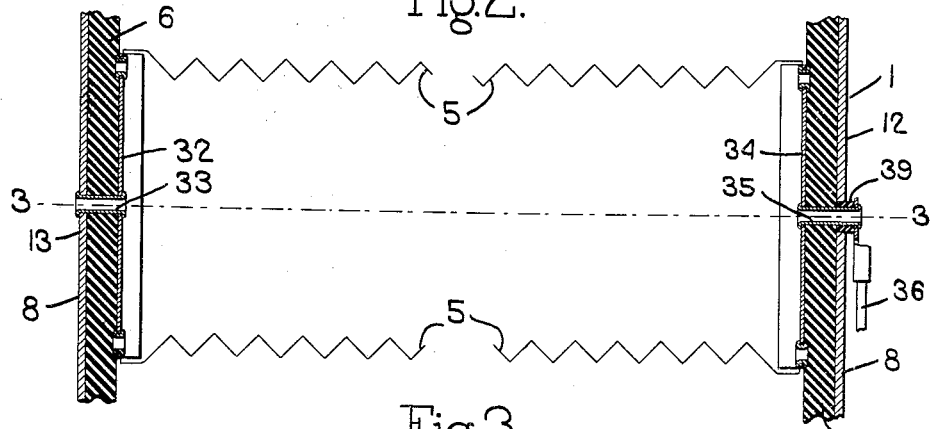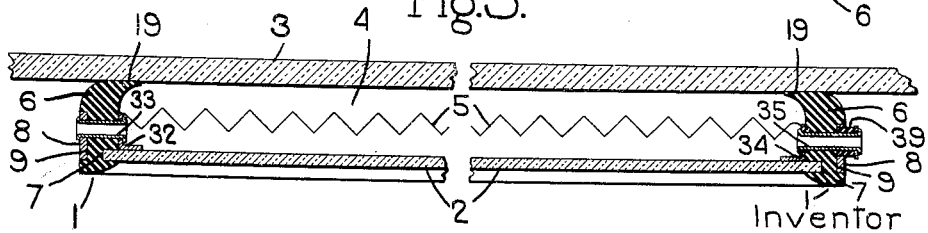

Inventor
Louis Zaiger
by Heard Smith & Tennant.
Attys.

Patented May 28, 1935

2,003,028

UNITED STATES PATENT OFFICE 2,003,028

WINDSHIELD HEATER

Louis Zaiger, Lynn, Mass.

Application June 6, 1934, Serial No. 729,294

7 Claims. (Cl. 219—19)

This invention relates to windshield heaters of the type which embody a glass-carrying frame supporting a pane of glass and adapted to be applied to the windshield to form therewith a shallow enclosure, and heating elements carried by the glass-carrying frame and located within the enclosure between the pane of glass and the windshield.

One of the objects of the present invention is to provide an improved windshield heater of this type having a novel form of frame and novel way of supporting the glass and the heating element and a further object is to provide a windshield heater of this type having novel means for attaching it to the windshield, which means serves to maintain the glass-carrying frame in tight contact with the windshield at all times.

In order to give an understanding of the invention I have illustrated in the drawings a selected embodiment thereof which will now be described after which the novel features will be pointed out in the appended claims.

In the drawings, Fig. 1 is a view of my windshield heater applied to a windshield;

Fig. 2 is a fragmentary sectional view showing the manner of mounting the heating elements;

Fig. 3 is a section on the line 3—3, Fig. 2;

Figure 4:
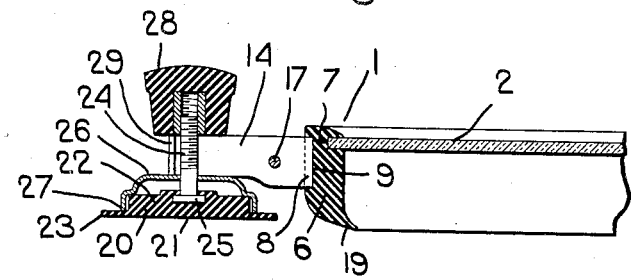
Fig. 4 is a section on the line 4—4, Fig. 1 showing the construction of the suction attaching means.

In the drawings 1 indicates a glass-carrying frame adapted to support a pane of glass 2, said frame 1 being adapted to be retained in position against the windshield 3 of the automobile so that the frame 1 and pane of glass 2 form with the windshield 3 a heating chamber 4 within which is located electrical heating units 5 as usual in windshield heaters of this type.

My improved glass-carrying frame 1 is formed with an annular glass-carrying member 6 of rubber which is provided on its inner face with a glass-receiving groove 7 in which the edge of the pane of glass 2 is received, and also formed with a lip portion 19 adapted to contact with the windshield 3. This lip portion 19 is flexible and has a progressively-decreasing thickness toward its peripheral edge thus making a sort of feather lip by which an air tight contact with a windshield can be produced.

Surrounding the annular rubber member 6 is a supporting member herein shown as a metal strip 8, the rubber member 6 preferably being provided with a groove 9 on its periphery to receive the metal strip 8. This metal strip or binding element 8 is preferably made in sections so that it can be readily applied to the rubber frame member.

While the metal strip may be made in two or any other desired number of sections I have shown in the drawings a binding element made in four sections indicated at 10, 11, 12 and 13. The section 10 is the top section which embraces the top of the frame, the section 11 is the bottom section and the two sections 12 and 13 are side sections. The top strip section 10 is formed at its ends with outwardly-directed arms 14 and the bottom section 11 is formed at its ends with similarly outwardly-directed arms 15. The side sections 12 and 13 are also formed with outwardly-extending arms 16.

The arms 14 of the top section 10 are clamped to the upper arms 16 of the side sections 12, 13 by some suitable means such as clamping screws 17 and the arms 15 of the bottom section 11 are similarly clamped to the lower arms 16 of the side sections 12, 13 by other clamping screws or clamping members 18. These clamping screws thus serve to clamp the metal binding element to the rubber element 6 and also serve to firmly hold the rubber element against the edge of the glass 2.

The arms 14, 15 and 16 not only serve as a means for clamping the binder element 8 to the rubber element 6 but also provide means for supporting suction cups by which the glass-carrying frame 1 is attached to the windshield 3. In the construction herein shown there are four such suction cups but if the metal binding strip were a two-section strip instead of a four-section strip then only two suction cups would be used.

The suction cups which I have herein illustrated are designed not only to effectively hold the glass-carrying frame in position against the windshield but also to maintain the lip 19 of the rubber element in firm contact with the glass thereby preventing the escape of the heated air or the admittance of cold air to said chamber 4.

Each suction cup comprises a rubber suction member 20 normally having a flat suction face 21. This suction member 20 is provided with a thickened portion 22 at its center and with the peripheral lip 23 which is relatively thin. 24 is a screw which has its head 25 moulded into the thickened portion 22. 26 is a cup-shaped metal member which embraces the thickened portion 22 of the suction cup and the edge 27 of which rests against the thinner lip portion 23. The stem of the screw 24 has a thumb piece or nut 28 screw threaded thereto.

Figure 5:
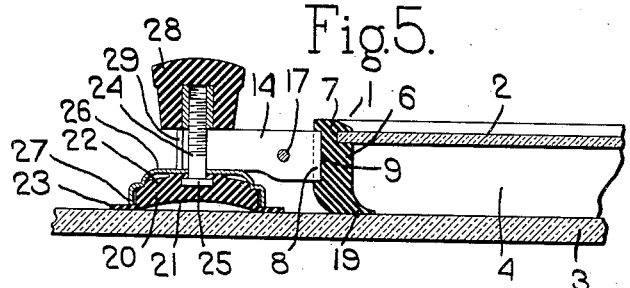
Fig. 5 is a view similar to Fig. 4 but showing the suction attaching means secured to the windshield.
Figure 6:
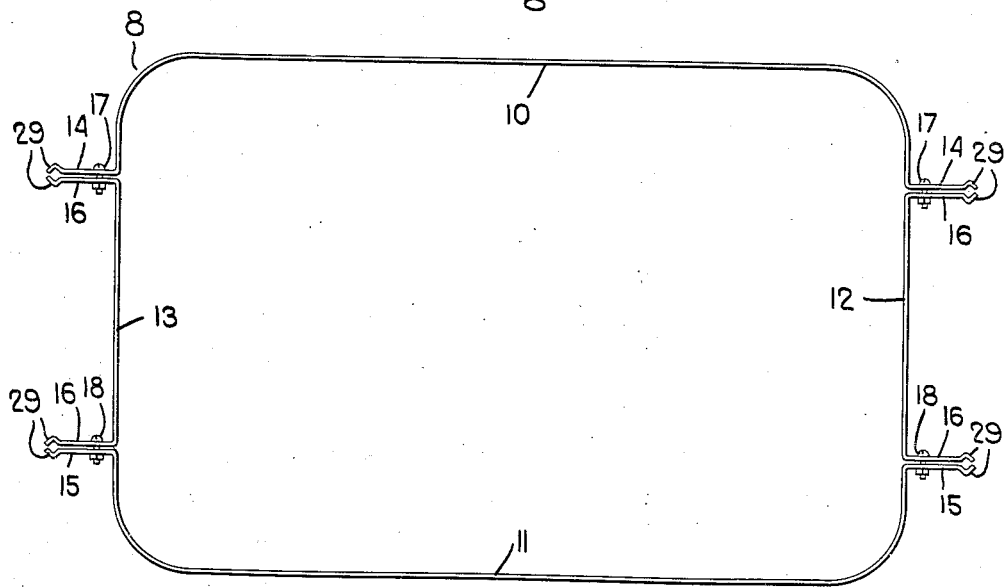
Fig. 6 is a view of the binding strip which clamps the rubber member of the frame to the glass.

These suction cup elements are carried by the mating arms of the sections of the metal strip 8, each mating pair of arms being bent at its extremity as shown at 29 to partially encircle the stem of the screw 24. In applying the device to the windshield the flat face 21 of each suction member is placed against the windshield glass and then the nut 28 is tightened, during which operation the nut will bear against the arms 14, 16 or 15, 16 and thereby against the cup-shaped member 26 thereby forcing the peripheral portion of the lip 23 against the windshield while at the same time the center portion of the suction member will be drawn upwardly as shown in Fig. 5 thus creating a vacuum. The amount of vacuum may be determined by screwing the nut 28 up more or less and by means of this construction the glass-carrying frame will be held very firmly to the windshield 3.

When it is desired to remove the windshield heater from the windshield, the clamping nuts or thumb pieces 28 will be backed off thereby allowing the suction member to resume its normal shape with a flat face. This will eliminate the vacuum beneath each suction cup so that it can be readily removed from the windshield.

The heating element for heating the air in the chamber 4 is herein illustrated as comprising two heating coils 5. These coils are fastened at one end to a metal bar 32 which lies against the inner face of the rubber element 6 inside of the lip 19 and which is fastened to one of the strip sections by means of a rivet 33, said bar thereby being electrically connected with said frame. The other ends of the coils are connected to another bar 34 which also lies on the inside of the rubber member 6 inside of the lip 19 but which is secured to the metal strip by an insulating connection. As herein shown this bar 34 is secured to the section 12 of the metal strip 8 by means of a rivet 35 which, however, is insulated from the metal strip 8 as shown at 39. This connection 35 provides a circuit connection to which one of the wires 36 of the heating circuit is attached, the other wire 37 being suitably connected to the metal strip 8. The current is thus supplied to the heating element through the wire 36 and the bar 35, and said heating elements are grounded on the metal strip 8, which in turn is connected to or grounded on the automobile frame through the wire connection 37.

An advantage which results from the type of suction cup herein shown is that said cup functions to draw the lip 19 of the frame 1 tightly against the windshield glass 3. When the glass-carrying frame 1 is to be applied to the windshield glass it will be placed in position with the flat faces of the suction cups resting against the windshield glass.

The tightening of the thumb piece 28 to produce the vacuum as shown in Fig. 5 does not cause any shifting of position of the frame relative to the glass, the frame still remaining in contact with the glass. After the vacuum has been created the suction tends to force the frame toward the glass thus maintaining a tight joint between the lip 19 and the windshield glass.

I claim:

1. A windshield heater comprising a glass-supporting frame, a pane of glass carried thereby, said frame including a rubber body portion of uniform cross-sectional shape and having on its inner face a glass-receiving groove in which the edge of the pane of glass is received and also having a windshield-engaging lip, and a sectional band of metal encircling the rubber body, the meeting ends of the band sections being bent outwardly to form outwardly-extending mating arms, each arm presenting at its extremity a clamping portion, a suction cup device supported in the clamping portions of each pair of mating arms and means connecting each pair of arms serving to clamp the metal band firmly around the rubber body member and to clamp said clamping portions to the suction cup devices.

2. A windshield heater comprising a glass-supporting frame, a pane of glass carried thereby, said frame including a rubber body portion of uniform cross-sectional shape and having on its inner face a glass-receiving groove in which the edge of the pane of glass is received and also having a windshield-engaging lip, and a sectional band of metal encircling the rubber body, the meeting ends of the band sections being bent outwardly to form outwardly-extending mating arms, each arm presenting at its extremity a clamping portion, a suction cup device supported in the clamping portions of each pair of mating arms and means connecting each pair of arms serving to clamp the metal band firmly around the rubber body member and to clamp said clamping portions to the suction cup devices, and an electric heating unit carried by the frame and situated between the pane of glass and the windshield.

3. A windshield heater comprising a glass-supporting frame, a pane of glass carried thereby, said frame having a rubber body portion of uniform cross-sectional shape formed on its inner face with a glass-receiving groove in which the edge of the pane of glass is received and on its outer face with a band-receiving groove, said body portion also having a windshield-engaging lip, a sectional band of metal encircling the body portion and occupying said band-receiving groove, the meeting ends of said sectional band being bent outwardly to form outwardly-extending arms, there being a pair of mating arms at each pair of meeting ends of the sectional band, each pair of arms being formed at its outer extremity with a suction cup clamping portion, a suction cup carried by the clamping portion of each pair of arms, clamping screws connecting the arms of each pair and clamping the sectional band tightly around the rubber body and also clamping each pair of arms to a suction cup.

4. A windshield heater comprising a glass-supporting frame, a pane of glass carried thereby, said frame having a rubber body portion of uniform cross-sectional shape formed on its inner face with a glass-receiving groove in which the edge of the pane of glass is received and on its outer face with a band-receiving groove, said body portion also having a windshield-engaging lip, a sectional band of metal encircling the body portion and occupying said band-receiving groove, the meeting ends of said sectional band being bent outwardly to form outwardly-extending arms, there being a pair of mating arms at each pair of meeting ends of the sectional band, each pair of arms being formed at its outer extremity with a suction cup clamping portion, a suction cup carried by the clamping portion of each pair of arms, clamping screws connecting the arms of each pair and clamping the sectional band tightly around the rubber body and also clamping each pair of arms to a suction cup, a coil-supporting bar at each end of the frame on the interior of the body portion, heating coils connecting said bars, non-insulated means connecting one bar to the band and insulated means for connecting the other bar to said band.

5. A windshield heater comprising a pane of glass, a glass-carrying member of rubber encircling the pane of glass and having on its inner face a groove in which the edge of the glass is received and also having a windshield-engaging lip, said glass-carrying member having a uniform cross-sectional area throughout, a metal supporting member encircling the glass-carrying member and clamping the latter to the edge of the glass, said metal supporting member having offset portions, and suction cups carried by the offset portions for securing the heater to a windshield.

6. A windshield heater comprising a pane of glass, a glass-carrying member of rubber encircling said pane of glass and having on its inner face a groove in which the edge of the glass is received and also having a windshield-engaging lip, a band of metal encircling the glass-carrying member and holding the latter in clamping relation to the edge of the glass, said band of metal having outwardly-extending arms, suction cups carried by said arms for attaching the heater to a windshield and an electric heating element extending from one side to the other of the heater and situated on the windshield side of the pane of glass.

7. A windshield heater comprising a pane of glass, a glass-carrying member of rubber encircling the glass and having on its inner face a groove to receive the edge of the glass and also having a windshield-engaging lip, a metal supporting member encircling the rubber glass-carrying member and holding the latter clamped to the edge of the glass, said metal supporting member having outwardly-extending arms, suction cups carried by said arms for holding the heater to the windshield, an electric heating unit carried by the supporting frame and situated on the windshield side of the glass.

LOUIS ZAIGER.